Dec. 15, 1959 W. F. LASER 2,917,329
ROTARY SEAL
Filed May 13, 1955
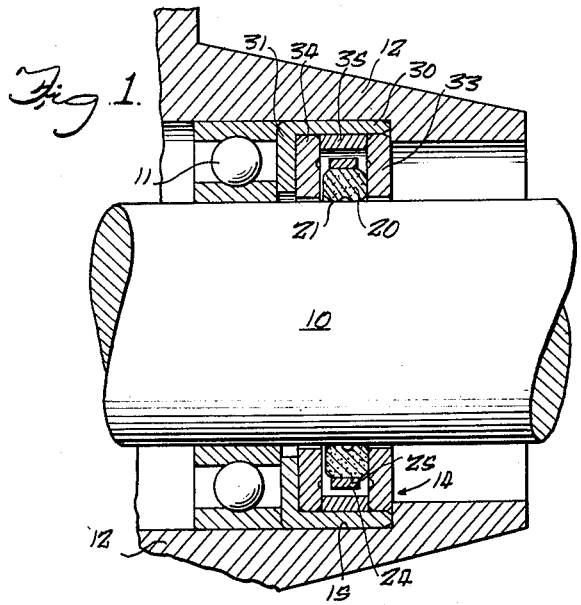
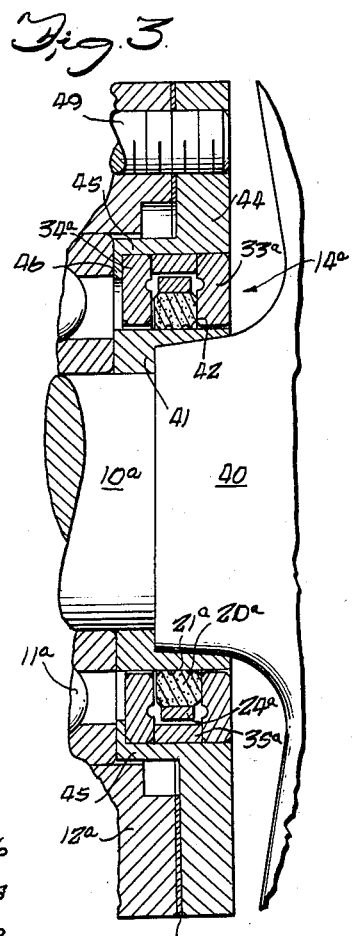
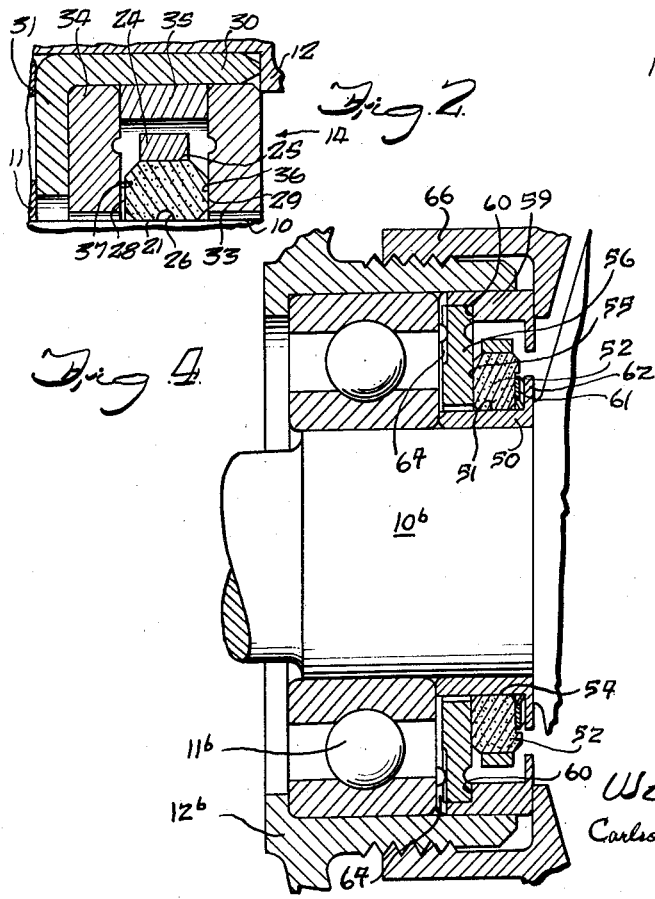
Inventor
William F. Laser
Carlson, Pitzner, Hubbard & Wolfe
Attorneys

United States Patent Office 2,917,329
Patented Dec. 15, 1959

2,917,329
ROTARY SEAL

William F. Laser, Hinsdale, Ill., assignor to City National Bank and Trust Company of Chicago, as trustee Application May 13, 1955, Serial No. 508,029

4 Claims. (Cl. 286—10)

The present invention relates to a cartridge type rotary seal for preventing the leakage of a high temperature gas around a high speed rotary shaft and more specifically to a cartridge seal of the type finding particular though not exclusive utility for sealing the rotating shaft in a gas turbine.

In applications in which it is necessary to prevent leakage of a high temperature fluid around a shaft rotating at high speeds, the use of sealing materials such as synthetic rubber or other compounds that would radically change in hardness or other properties at high temperatures is precluded. Many of these applications require a static seal, i.e. sealing even when the shaft is stationary, as well as a rotary seal for the high temperature, pressurized gas. Because of the operating conditions involved in such applications, in a gas turbine for example, it is not possible to use a seal employing O rings made of the above described materials in order to obtain a positive static seal. Where the shaft rotates at high speeds, labyrinth type seals have found a wide use. These labyrinth seals do not provide a static seal, however, and have at times proven unsatisfactory as rotary seals because of the high rate of leakage and the inconsistency of sealing action attributed to eccentric rotation of the shafts.

It is an object of this invention to provide a rotary seal which is effective for sealing high temperature gases against leakage under both static and high speed conditions. A related object is to provide a sealing cartridge which may be used for an extremely wide range of operating conditions, such as temperature, pressure and rotary speed, including static conditions, and which not only provides an effective sealing action, but is of a simple, economical construction, and easily installed in a minimum of space.

It is another object to provide, for use in a sealing unit having the above described characteristics, a temperature resistant rotary sealing element suitable for positioning intermediate a rotating member and a stationary member and for maintaining a sealing engagement with both by means of close running engagement between microsmooth sealing surfaces on the members and the sealing element in order to prevent the leakage of a high temperature gas and to provide means for establishing and maintaining the close running engagement.

It is a further object to provide a novel seal for a rotating shaft in a high temperature gas operated device which adjusts itself automatically to proper running conditions as pressure is applied and the device comes up to operating temperature. It is a more detailed object to provide a novel seal construction which makes use of the shaft expansion characteristics to maintain the desired adjustment.

It is a still further object to provide a seal which is capable of operating dry but which exhibits lack of wear even under the most rigorous, high temperature, high speed conditions.

Still another object of the invention in one of its aspects is to provide a seal construction which is non-directional; i.e., which is capable of sealing regardless of the direction of application of pressure.

Finally, it is an object to provide a seal which is reliable at the high speeds characteristic of gas turbines, centrifuges and the like, and which permits use of sealing rotors constructed of frangible materials such as carbon or ceramic materials without danger of breakage.

Other objects and advantages will become apparent as the following description proceeds, taken in connection with the accompanying drawing wherein:

Figure 1 is a sectional view of a sealing cartridge constructed in accordance with the present invention, shown as interposed between a casing wall and a rotatable shaft.

Fig. 2 is an enlarged fragmentary sectional view of the sealing arrangement shown in Fig. 1.

Fig. 3 is a sectional view in elevation of a sealing cartridge embodying the present invention shown as applied to a shaft having a stepped or nonuniform diameter.

Fig. 4 shows a modified form of the sealing device employing a biasing spring to provide a positive seal in applications involving two fluids in pressure opposition.

While the invention is susceptible of various modifications and alternative constructions, preferred embodiments have been shown in the drawing and will be described below in detail. It should be understood, however, that there is no intention to limit the invention to the specific forms disclosed, but on the contrary the intention is to cover all modifications and alternative constructions falling within the spirit and scope of the invention as expressed in the appended claims.

Referring now to Fig. 1, there is shown a shaft 10 rotatably supported in a bearing 11 mounted in the casing wall 12 of a gas turbine, pressure vessel, or the like in which it is desired to maintain a high temperature gas. A sealing cartridge 14, constructed in keeping with the invention, is received in an opening 15 of the wall 12. In the following description, it will be assumed that the gas pressure on the bearing side of the seal is greater than that on the side opposite the bearing. It will be apparent, however, that the seal would operate equally well if the pressure were applied in the reverse direction.

In accordance with the present invention, a gastight seal is maintained between two relative rotatable parts (e.g., the shaft 10 and the casing 12) by providing a first sealing component secured to one of the parts, and a second sealing component, having sealing contact with the first component, which is either fast on the other part or rotates in sealing contact relative thereto. When the latter condition obtains, the second component is said to "float" and provide a floating seal by maintaining a sealing action simultaneously between the relatively rotatable parts without being fixed to either. This floating action permits a freedom of a relative movement between the parts without decreasing the effectiveness of the seal.

Mounted on shaft 10 and rotatable with respect thereto is an annular sealing element or rotor 20 illustrative of the present invention. This rotor is shown in detail in Fig. 2. For sealing engagement with the shaft, the inner sealing surface 21 of rotor 20 is made parallel to the axis of rotation of the rotor, and is lapped to a smoothness, measured in millionths of an inch, which is sufficient to prevent leakage of the gas. In order to accomplish sealing between the shaft and the rotor surface 21 and still permit relative movement therebetween, the maximum clearance between the outer surface of the shaft and the inner surface of the rotor is held to extremely close tolerances, also measured in milliionths of an inch.

In the early stages of operation, the rotor tends to rotate with the shaft, even though there is no direct mechanical attachment to the shaft. This rotation is due to physical binding or to the friction forces created by the presence of a molecular layer of fluid between the shaft 10 and the rotor 20. Because of the slight clearance between rotor and shaft, however, combined with the inherent effect of centrifugal force on the rotor itself, the rotor is capable of moving axially under gas pressure into running engagement with the stator, for example as shown in Fig. 1. When, however, the shaft and the sealing rotor are subjected to a high temperature fluid over a prolonged period of time, or are heated by friction in the bearing there is a slight expansion. The clearance between the rotor and the shaft being initially extremely small, the thermal coefficient of expansion of the rotor should be equal to or less than the thermal coefficient of expansion of the shaft so that, upon heating of the parts, the clearance is not increased. Preferably, these coefficients are so chosen that, upon expansion of both the rotor and the shaft, the clearance between them will preferably decrease, even to a point where there is a seizure between the shaft and the rotor. Under this condition, when expansion takes place and seizure occurs, a positive seal is formed between the shaft and the rotor, and the rotor is thereby driven directly by the shaft.

In consideration of the above requirements, it has been found that carbon has particularly advantageous properties for use as a rotor material, although ceramics or metals should be recognized as suitable substitutes for use when the operating conditions so require. When a carbon rotor is used, a retaining ring 24 is desirably placed around the outer surface 25 of the rotor to insure that the rotor is always in compression. This ring prevents destruction of the rotor 20 by the relatively greater thermal expansion of the shaft 10. Grooves 26 are provided in the inner surface 21 of the rotor in order to reduce the chances of dirt collecting between the rotor and the shaft and causing binding of thereto or the destruction of the sealing faces.

In order to complete the sealing action of the rotor, a seal between the rotor and shaft being accomplished as described, means secured to the casing are adapted to sealingly engage the radial end walls of the rotor. Surrounding the annular rotor sealing element 20, is a cylindrical shell 30 having an inwardly projecting annular flange 31 against which the bearing 11 may be placed. A pair of parallel annular stator rings 33 and 34 are pressed into the shell and positioned on opposite sides of the rotor 20. The confronting end faces 36 and 37 respectively of the stator rings 33 and 34 are lapped to a high degree of flatness and smoothness as are the annular end faces of the rotor, and at least one of the stator faces cooperates with the corresponding face of the rotor to provide a radial seal and prevent the leakage of the fluid. The faces should of course be precisely perpendicular to the axis of rotation.

For proper sealing action, the rings 33 and 34 should be parallel and be spaced apart just slightly more than the thickness between the annular faces of the rotor. This accurate positioning of the rings is accomplished by use of an accurately machined spacer ring 35 disposed between the stator rings. It will be apparent then that the rotor is always sufficiently close to both stators as to produce a constricted gas outlet so that the internal gas pressure is effective to move the rotor into a sealing position. The spaced annular stator rings 33 and 34 have a relatively large diameter, leaving a substantial clearance with the rotary shaft, with a sufficient allowance being made for a possible slightly eccentric axis of rotation of the shaft with respect to the seal.

The material used for the stator, as in the case of the rotor, depends upon the nature of the gas being confined. The thermal coefficient of expansion is not a critical factor since the clearance between the rings and the shaft is purposely made sufficient to prevent any binding between the shaft and the stator. Where the gas is noncorrosive, such as air for example, the stator may be made of a hardened steel machined to present a smooth bearing surface. If it is so desired, the stators 33 and 34 may be formed of highly compressed carbon or graphite having a lapped, i.e., flat and smooth sealing surface.

The seal 14, when mounted in place within the casing 12 and surrounding the shaft 10 effectively prevents the leakage of a high temperature fluid which is present on one side of the seal at a relatively higher pressure than that obtaining on the opposite side of the seal. Because of the closeness of the shaft 10 and the rotor 20, the leakage, if any, between them will be very slight when the shaft is stationary. And, since the sealing surfaces of the rotor and the stator are smooth and parallel, little, if any, leakage will occur between these surfaces even when the rotor is stationary relative to the stator.

By way of summary, a typical operating sequence is as follows: Upon the rotation of the shaft, the rotor will tend to rotate therewith as described above, and at approximately the same speed. Such rotation sets up centrifugal forces in the rotor which inherently cause it to expand slightly, tending to increase the clearance between the rotor and shaft and making it easier for the rotor to move endwise into its running position under the urging of the gas pressure in the vessel.

After prolonged operation at high temperatures, i.e., after the device comes up to its operating temperature, expansion of the shaft may cause it to bind the rotor and thus drive it directly. No sealing action is lost between the rotor and the stator because of this binding; on the contrary, the binding of the rotor on the shaft tends to fix the rotor in a desired running position relative to the stator.

Also during such high speed rotation centrifugal force acting on the gas in the annular cavity surrounding the rotor tends to build up gas pressure in this region which is higher than that in the vessel. This tends to oppose leakage from the vessel around the edge of the rotor. Thus, in the event that the rotor should be subjected to an axial movement, due to thermal expansion or the like in a direction to retract the rotor from the stator, the centrifugal gas pressure present in the annular stator cavity would prevent leakage of the gas. When the turbine or the like is shut down, the rotor and stator are left in their condition of engagement which is to be contrasted with the usual type of labyrinth seals which provide a running seal but not a static seal. Providing two symmetrically arranged stator elements 33, 34 with only limited clearance between them and the rotor makes it possible for the rotor to form a seal with either one of them dependent on the direction of the applied pressure and the axial position of the shaft; consequently, the above comments are applicable to either of the two stator elements.

It should be appreciated that the present embodiment of the invention also provides for maintaining a seal in spite of rotation of the shaft and sealing rotor about an axis slightly eccentric to the axis of the stator, the sealing surfaces being machined to the desired smoothness over a sufficient area to accommodate any eccentric movement.

A modified form of the sealing unit embodying the present invention has been provided as illustrated in Fig. 3, similar reference characters being used when applicable but with the distinguishing suffix "a." In this modification, the seal has been adapted for use with a shaft 10a having a diametrically enlarged portion 40 such as the hub of a turbine wheel. To accommodate the shaft for use with a bearing which must be axially close to the turbine wheel, a sleeve 41 is fitted over the stepped portion of the shaft 40. The surface 42 of the sleeve is machined to the required smoothness and radial dimensions. The rotor 20a thus cooperates with the peripheral surface of the sleeve 41 in lieu of the shaft surface to provide the sealing action described above.

The sealing cartridge has been further modified to permit it to be bolted to the casing 12a. This is achieved by providing a housing 44 having an axially extending portion or collar 45 in which the stator sealing members 33a and 34a and the spacer member 35a are received. The collar 45 is provided with an inwardly projecting annular flange 46 against which the bearing 11a abuts. A suitable gasket 48 may be interposed between the housing 44 and the casing wall 12a to prevent leakage of the fluid and the housing is rigidly secured to the casing wall by bolts 49.

It should be apparent, therefore, that this particular sealing unit construction has been adapted to permit the mounting of the seal closely adjacent the rotating wheel 40 in applications where it is necessary to conserve space, such as in gas turbines and the like.

Another modification of a sealing unit embodying the present invention is shown in Fig. 4, similar reference characters being used where applicable along with the distinguishing suffix "b." Provision has been made in this particular modification to prevent leakage between the rotor and the stator when the seal is used in applications involving a low pressure, high temperature gas which is opposed by a lubricant under a pressure of lesser magnitude. Upon shutdown, when gas pressure is released, the lubricant which is still under slight pressure is kept sealed. This result is accomplished by providing means which exert a biasing force on the rotor member to urge it axially against the stator member in a sealing relationship.

The shaft 10b is supported, as in the previously described arrangements, in housing 12b by means of a bearing 11b. A sleeve 50 is mounted fast with and in gas tight engagement on the shaft 10b, the outer surface 51 of the sleeve 50 being machined to the required smoothness. The sleeve 50 cooperates with an annular sealing rotor 52, the inner surface 54 of which is also machined smooth. The rotor 52 and the sleeve 50 are dimensioned to provide a clearance between them which is sufficient to permit a relative axial sliding movement and yet will prevent a substantial leakage of the gas or the lubricant when the shaft is not rotating. One annular face 55 of the rotor 52 is machined to the required flatness and smoothness and cooperates with a parallel annular stator ring 56, the sealing face of which is similarly smooth. The ring 56 is mounted in a housing 59 which may be secured to the casing in any desired manner. An accurately machined annular seat 60 is formed in the housing to insure the location of the sealing ring in such a position that its sealing face is parallel to the sealing face of the rotor.

The rotor is biased axially into sealing contact with the stator ring 56 by means of an annular wave spring 61 positioned intermediate the rotor and an upwardly projecting collar 62 integrally formed on the sleeve 50. A positive lubricant pressure exists on the bearing side of the seal and oil slots 64 are provided in the stator ring for the purpose of directing the oil to the bearing elements. Normally, under running conditions a positive gas pressure is present on the opposite side of the bearing from the lubricant, and at a pressure greater than that of the lubricant. Under certain conditions, however, such as at the initiation or termination of rotation where the gas pressure is less than the lubricant pressure, the spring 61 provides the necessary biasing force to cause the rotor 52 to sealingly impinge on the stator 56 and thereby prevent the escape of the lubricant.

In all of the above modifications, the cartridge seal housing may be cemented in place in the casing by use of a high temperature resistant cement. An additional securing means is provided in the modification of Fig. 4 in the form of a collar 66 threaded on the casing 12b and holding the bearing and cartridge seal in an assembled relation.

I claim as my invention:

1. In a cartridge seal for preventing leakage of high temperature gas between a rotating shaft and a stationary casing, the combination comprising a cylindrical housing mountable in the casing in surrounding relation to the shaft, a pair of spaced apart, inwardly directed annular stator elements fixed in said housing parallel to each other and provided with smooth sealing surfaces on the confronting end walls thereof, and an annular rotor for surrounding the shaft projecting radially into said housing intermediate said parallel stator elements, said rotor having an internal diameter less than the internal diameter of said stator elements and snugly slidable along said shaft within the limits of said stator elements, said rotor also having its inner surface lapped smooth for gastight sealing engagement with the shaft and its end walls lapped smooth and parallel for sealing engagement with at least one of said stator sealing surfaces to form a seal, and a ring member interposed between said stator elements for spacing them apart an amount which is just slightly greater than the thickness of the rotor and for defining a confined annular chamber surrounding said rotor for the building up of centrifugal gas pressure therein.

2. For use with a gas pressure device having a casing and a rotating shaft supported against endwise thrust and projecting through the wall thereof, the combination comprising a pair of annular stator elements adapted to be mounted in said casing alined with said shaft and having lapped inwardly directed faces respectively, an annular rotor element having a snug sliding fit on the shaft and arranged between said stator elements, said rotor element having lapped parallel end faces, and an annular spacer element interposed between said stator elements for maintaining the faces of the latter precisely parallel and spaced apart an amount which is just slightly greater than the thickness of the rotor.

3. For use with a gas pressure maintaining housing having a rotatable shaft passing through an opening therein, a high speed, extreme temperature rotary seal for preventing gas leakage through said opening along said shaft comprising, in combination, an annular casing surrounding said shaft and sealed in gas-tight relation to said housing, said casing having a radial wall facing the direction of said gas pressure together with an opposed parallel wall, said casing and walls defining an annular gas-tight chamber opening only inwardly toward said shaft, said first-mentioned wall defining a flat, lapped, radial sealing surface, an annular rotor disposed within said chamber, and being slidably fitted on a portion of said shaft to slide between said walls, said rotor having a flat, lapped, radial sealing surface facing said first-mentioned wall, said rotor and said shaft portion being formed of materials having different thermal coefficients of expansion so that the rotor is seized by said shaft portion when said extreme temperature is reached.

4. For use with a gas pressure maintaining housing having a rotatable shaft passing through an opening therein, a high speed, high temperature rotary seal for preventing gas leakage through said opening along said shaft comprising, in combination, an annular casing surrounding said shaft and sealed in gas-tight relation to said housing, said casing defining an annular gas-tight chamber opening only inwardly toward said shaft and having a pair of opposed radial walls each defining a flat, lapped radial sealing surface, an annular rotor disposed within said chamber and being slidably fitted on a portion of said shaft so as to slide between said walls, said rotor having opposite flat, lapped, radial sealing surfaces facing said walls, said rotor being formed of material having a lower thermal coefficient of expansion than said shaft portion so that the rotor is seized by said shaft portion when said high operating temperature is reached.

References Cited in the file of this patent

UNITED STATES PATENTS

| | | |
|---|---|---|
| 2,479,711 | Arutunoff | Aug. 23, 1949 |
| 2,622,449 | Barker | Dec. 23, 1952 |
| 2,705,653 | MacLeod | Apr. 5, 1955 |